United States Patent [19]
Kuyama

[11] Patent Number: 5,976,044
[45] Date of Patent: Nov. 2, 1999

[54] COOLING STRUCTURE OF BELT TRANSMISSION FOR VEHICLE

[75] Inventor: Kouhei Kuyama, Akashi, Japan

[73] Assignee: Kawasaki Jukogyo Kabushiki Kaisha, Kobe, Japan

[21] Appl. No.: 08/947,173

[22] Filed: Oct. 8, 1997

[30] Foreign Application Priority Data

Oct. 8, 1996 [JP] Japan ..................................... 8-267301

[51] Int. Cl.⁶ ........................... F16H 57/04; F16H 57/02; F16H 7/24
[52] U.S. Cl. ............................ 474/93; 474/146; 474/150; 74/606 A
[58] Field of Search ................................... 474/93, 8, 13, 474/14, 144, 146, 150; 74/606 R, 606 A; 180/230, 231

[56] References Cited

U.S. PATENT DOCUMENTS

| | | | |
|---|---|---|---|
| 2,315,317 | 3/1943 | Copp et al. ................................ | 474/93 |
| 4,344,500 | 8/1982 | Kurata et al. ............................. | 474/146 |
| 4,422,498 | 12/1983 | Chen ........................................ | 474/93 |
| 4,493,677 | 1/1985 | Ikenoya ..................................... | 474/93 |
| 4,531,928 | 7/1985 | Ikenoya . | |
| 4,596,537 | 6/1986 | Te-Long .................................... | 474/93 |
| 4,631,977 | 12/1986 | Kawashima ............................... | 474/93 |
| 4,671,781 | 6/1987 | Tanaka et al. ............................. | 474/93 |
| 4,671,782 | 6/1987 | Ochiai et al. .............................. | 474/93 |
| 4,697,665 | 10/1987 | Eastman et al. . | |
| 4,708,699 | 11/1987 | Takano et al. ............................ | 474/93 |
| 4,754,833 | 7/1988 | Kawashima ............................... | 474/93 |

FOREIGN PATENT DOCUMENTS

| | | | |
|---|---|---|---|
| 3929019 | 3/1991 | Germany ................................. | 474/93 |
| 58-96157 | 12/1981 | Japan . | |
| 58-96157 | 6/1983 | Japan . | |
| 61-162528 | 4/1986 | Japan . | |
| 61-262264 | 11/1986 | Japan . | |
| 5-26328 | 2/1993 | Japan . | |

*Primary Examiner*—Thomas R. Hannon
*Assistant Examiner*—Matthew A. Kaness
*Attorney, Agent, or Firm*—Marshall, O'Toole, Gerstein, Murray & Borun

[57] ABSTRACT

A cooling structure of a belt transmission for vehicles which limits the consumed power for cooling to a minimum and does not deteriorate cooling performance of the transmission. A drive pulley having a variable pitch diameter and a driven pulley which is driven through a drive belt and has a variable pitch diameter is housed in a substantially elliptical housing. An intake port formed in the vicinity of a suction part of the cooling fan formed on the drive pulley in the housing to forcedly introduce air from the outside and exhaust air to the outside. An exhaust port on the housing in a normal direction of the driven pulley at the rearward of a center of rotation of the driven pulley as seen from a side.

9 Claims, 6 Drawing Sheets

COOLING STRUCTURE OF BELT TRANSMISSION FOR VEHICLE

FIELD OF THE INVENTION

The present invention relates to a cooling structure of a belt transmission mounted as a transmission on vehicles such as two-wheelers, three- or four-wheeled working vehicles, three- or four-wheeled leisure vehicles, or snow mobiles.

BACKGROUND OF THE RELATED ART

Conventionally, a belt transmission has been employed as a transmission for vehicles such as two-wheelers, three- or four-wheeled working vehicles, three- or four-wheeled leisure vehicles, or snow mobiles because the structure is simple, a gear-change is unnecessary and shock is not caused when changing the gear.

The belt transmission has a structure in which a whole belt transmission mechanism comprising a variable pitch diameter type drive pulley driven by a drive shaft of an engine and a variable pitch diameter type driven pulley driven by the drive pulley through a drive belt is isolated from the environment by a housing in such a manner that sand, dust and the like do not get into the contact faces of the drive belt and the pulleys.

Air is sucked into the housing through an intake duct, and is exhausted from an exhaust duct provided at a position on the housing apart from the intake duct so that the inside of the housing is forcedly cooled by the air. Thus, friction heat and other heat generated between the drive belt and the pulleys are exhausted to the outside.

In order to efficiently cool the inside of the housing by the air, a cooling fan is integrally provided on the drive pulley to forcedly suck the air from the intake duct, and the cooling fan is also provided on the driven pulley to forcedly exhaust the air in the housing to the outside. In the belt transmission, it is necessary to efficiently cool the inside of the housing by the air under low speed/high load conditions such as hilly terrains or the case where heavy packages are loaded as well as high speed conditions. In order to efficiently perform air-cooling under the low speed conditions as well as the high speed conditions, accordingly, the cooling fan is provided on the drive pulley and the driven pulley as described above in such a manner that the air is forcedly sucked and exhausted. The prior art of this kind has been disclosed in Japanese Unexamined Utility Model Publication No. 58-96157.

However, if the cooling fan is provided on the driven pulley as described above, a certain amount of power of the engine is consumed for the cooling fan. Consequently, the engine power applied to drive a vehicle is reduced. More specifically, in case of a leisure vehicle on which an engine of about 20 horsepower is mounted and which runs at a maximum speed of about 40 to 60 km/h, about 3 to 4 horsepower is sometimes consumed by the cooling fan of the driven pulley. In other words, runability is deteriorated for the power consumed by the cooling fan of the driven pulley.

SUMMARY OF THE INVENTION

In consideration of the foregoing, it is an object of the present invention to provide a cooling structure of a belt transmission for vehicles which controls a consumed horsepower for cooling to a minimum and does not deteriorate cooling performance in the transmission.

A first aspect of the present invention is directed to a cooling structure of a belt transmission for vehicles comprising a belt transmission mechanism including a drive pulley which is driven by a drive shaft of an engine and has a variable pitch diameter, and a driven pulley which is driven by the drive pulley through a drive belt and has a variable pitch diameter, an almost elliptic housing for housing the belt transmission mechanism as seen from a side surrounding the drive pulley and the driven pulley, a cooling fan formed on the drive pulley, an intake port formed in the vicinity of a suction part of the cooling fan of the housing for forcedly introducing air from an outside environment into the housing, and an exhaust port formed in the vicinity of the driven pulley of the housing for exhausting the air cooling the inside of the housing to the outside, wherein the exhaust port is provided on the housing in a normal direction of the driven pulley at the rearward of a center of rotation of the driven pulley as seen from a side.

According to the cooling structure of a belt transmission for vehicles having such a structure that the exhaust port is provided on the housing in a normal direction of the driven pulley at the rearward of a center of rotation of the driven pulley, a very smooth cooling air flow path is formed from the intake port to the exhaust port provided in the rear position thereof on the housing. Therefore, the cooling air in the housing flows with a very small pressure loss and less turbulence, and a great air flow for cooling is formed. Consequently, necessary cooling performance can be obtained even if the cooling fan is not provided on the driven pulley unlike a conventional cooling structure.

A second aspect of the present invention is directed to the cooling structure of a belt transmission for vehicles as defined in the first aspect of the present invention, wherein the driven pulley is provided in such a manner that a center of the exhaust port is almost coincident with a center of a V-tapered trench of the pulley in a state in which a movable sheave and a fixed sheave of the driven pulley are the closest to each other as seen in a plane. Consequently, during high speed running which requires the greatest cooling, the movable sheave of the driven pulley separates from the fixed sheave thereof most greatly so that a large space is formed therebetween. In other words, the state in which both sheaves are not positioned in front of the exhaust port is obtained (see a two-dotted line in FIG. 1). As a result, a straight path is formed toward the exhaust port in the housing. Consequently, very efficient cooling can be obtained. More specifically, the cooling air which is forcedly introduced from the intake port cools the drive pulley, the drive belt, the driven pulley and the like, and flows almost like a laminar flow at a high speed through the large space formed between the movable sheave and the fixed sheave of the driven pulley. As a result, a large amount of cooling air sucked during high speed running can pass almost like the laminar flow in the housing at a high speed, can effectively absorb heat of each pulley and the drive belt, a casing or the like and can be exhausted to the outside of the housing.

A third aspect of the present invention is directed to the cooling structure of a belt transmission for vehicles as defined in the first or second aspect of the present invention, wherein the exhaust port is substantially provided on the housing on the extended line rearward through the center of rotation of the driven pulley as seen from a side. Consequently, a cooling flow path having a very small pressure loss is formed from the intake port to the exhaust port. The cooling air which is forcedly sucked by the cooling fan of the drive pulley can hydrodynamically be guided very smoothly to the exhaust port on the basis of a relationship with a shape of the housing, and can be exhausted from the exhaust port to the outside of the housing.

A fourth aspect of the present invention is directed to the cooling structure of a belt transmission for vehicles as defined in any of the first to third aspects of the present invention, wherein a rear portion of the housing is formed so as to be gradually reduced toward the exhaust port. Consequently, the cooling air flow can smoothly be guided almost like a laminar flow to the exhaust port more efficiently.

A fifth aspect of the present invention is directed to the cooling structure of a belt transmission for vehicles as defined in any of the first to fourth aspects of the present invention, wherein a guide portion for guiding, to the exhaust port, a mainstream of cooling air which is forcedly supplied into the housing by the cooling fan and flows toward the exhaust port is formed in succession to the exhaust port. By guiding function of the guide portion, the cooling air can be guided to the exhaust port more efficiently.

A sixth aspect of the present invention is directed to a cooling structure of a belt transmission for vehicles comprising a belt transmission mechanism including a drive pulley which is driven by a drive shaft of an engine and has a variable pitch diameter, and a driven pulley which is driven by the drive pulley through a drive belt and has a variable pitch diameter, an almost elliptic housing for housing the belt transmission mechanism as seen from a side surrounding the drive pulley and the driven pulley, a cooling fan formed on a side of the drive pulley, an intake port formed in the vicinity of a suction part of the cooling fan of the housing for forcedly introducing air from an environment outside into the housing, an exhaust port formed in the vicinity of the driven pulley of the housing for exhausting the air cooling an inside of the housing to the outside, and a second exhaust port provided in the vicinity of the driven pulley of the housing.

According to the cooling structure of a belt transmission for vehicles having such a structure, the total sectional area of the exhaust port is increased by adding the second exhaust port. Consequently, even if the driven pulley has no cooling fan itself, the cooling air flow in the housing is increased so that a consumed power for cooling can be controlled to a minimum and cooling performance of the transmission can be maintained.

A seventh aspect of the present invention is directed to the cooling structure of a belt transmission for vehicles as defined in the sixth aspect of the present invention, wherein a movable sheave of the driven pulley is positioned in an inner part (engine side) of the housing with respect to a fixed sheave, and the second exhaust port is provided in a side portion of the housing positioned on an inner part (engine side) of the movable sheave of the driven pulley. Consequently, when the vehicle runs at a low speed with a high load in which an amount of sucked cooling air is decreased, the movable sheave of the driven pulley separates from the second exhaust port so that a cooling air path is enlarged. Thus, the cooling air can be exhausted from the second exhaust port more effectively. With a structure in which even if the second exhaust port is blocked to some extent when the vehicle runs at a high speed, a large space is formed between both sheaves of the driven pulley as defined in the second aspect of the present invention, the cooling air path is sufficiently kept. In addition, the revolution speed of the drive pulley including the cooling fan is high. Consequently, a large amount of cooling air can be sucked and can be exhausted from the exhaust port. Thus, the inside of the housing of the transmission can be cooled sufficiently. Furthermore, because the second exhaust port is provided on the side part of the movable sheave of the driven pulley in the housing, the second exhaust port does not protrude onto the outside of the housing. Consequently, this structure is excellent in that protrusion onto the outside of the vehicle can be eliminated when mounting the transmission on the vehicle.

According to the cooling structure of a belt transmission for vehicles of the present invention, the pressure loss of the air flowing in the housing is reduced and the cooling performance of the transmission is not deteriorated.

DETAILED DESCRIPTION OF THE INVENTION

A cooling structure of a belt transmission for vehicles according to an embodiment of the present invention will be described below with reference to the drawings.

By way of example, the case where the cooling structure of a belt transmission for vehicles is mounted on a four-wheeled leisure vehicle will be described in the present embodiment.

Figure 1:
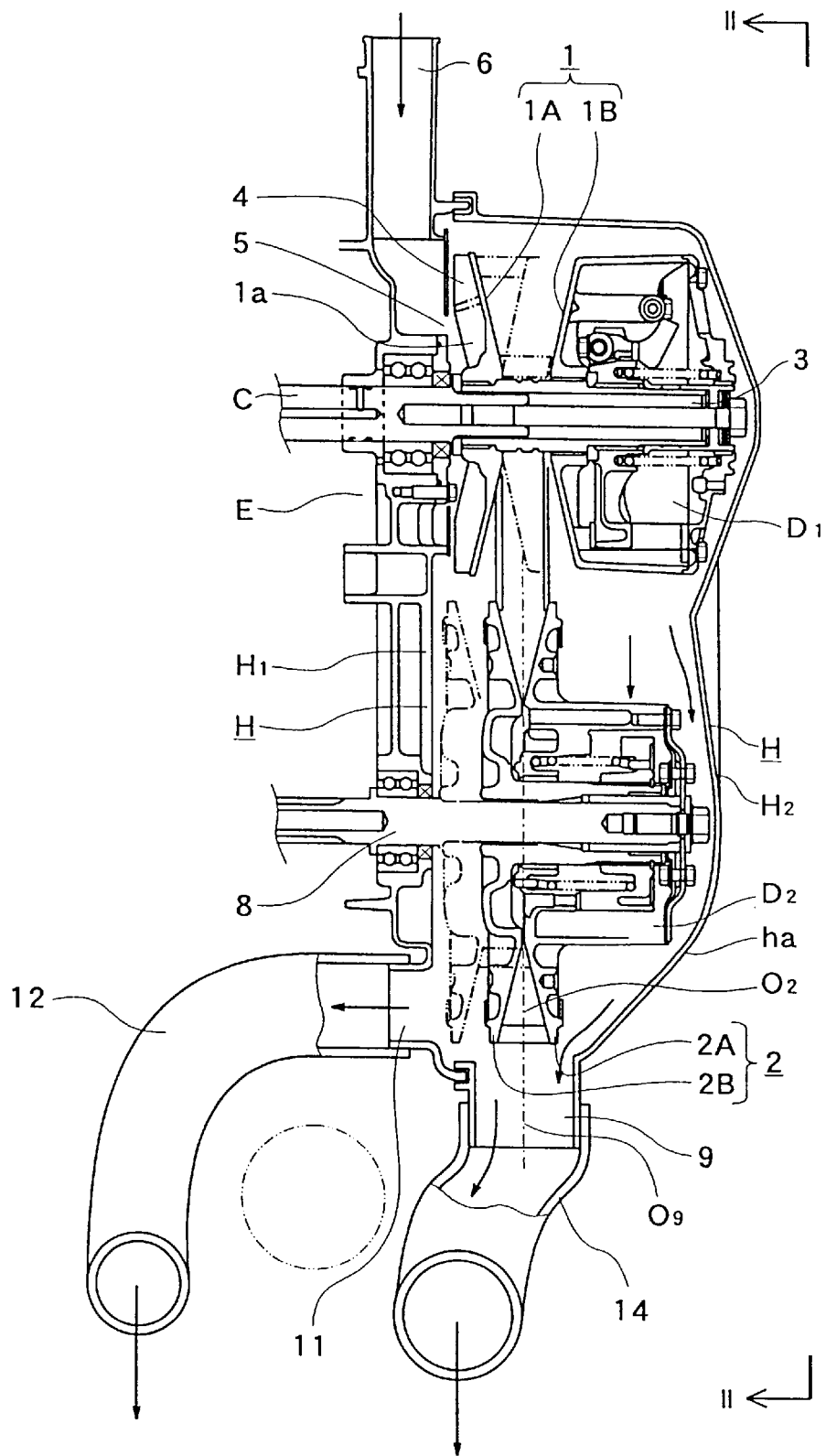
FIG. 1 is a sectional plan view showing a cooling structure embodiment of the present invention, which is taken along sectional lines I—I in FIG. 2.
Figure 2:
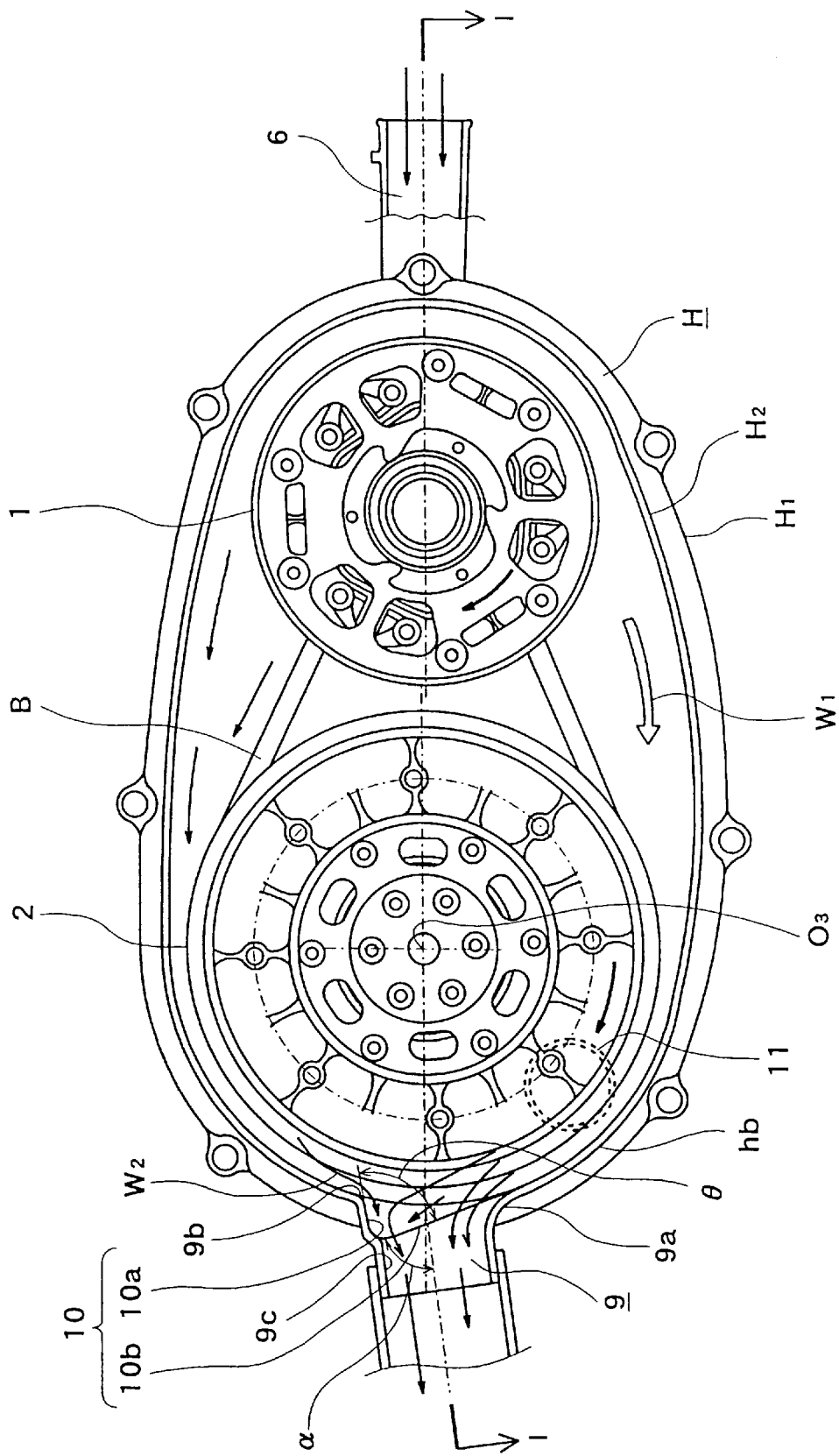
FIG. 2 is a side view of the transmission showing a shape of a housing and its internal structure (seen from reference lines II—II in FIG. 1)

FIG. 1 is a sectional plan view showing the cooling structure of a belt transmission for vehicles according to the embodiment of the present invention, which is taken along sectional lines I—I in FIG. 2, and FIG. 2 is a side view of the transmission showing a shape of a housing and its internal structure (seen from reference lines II—II in FIG. 1).

In FIGS. 1 and 2, a housing H houses a transmission mechanism which comprises a drive pulley 1 and a driven pulley 2. A drive belt B is wound on the drive pulley 1 and the driven pulley 2.

The drive pulley 1 is provided on a tip of an input shaft 3 (the right side in FIG. 1) in such a manner that it rotates integrally with the input shaft 3. The input shaft 3 is integrally engaged with a crankshaft C extended from an engine E provided on the left side in FIG. 1 (an engine itself is not shown). The drive pulley 1 includes a fixed sheave 1A and a movable sheave 1B in pairs. The movable sheave 1B is formed so as to approach or separate from the fixed sheave 1A provided on the engine E side on the input shaft 3. More specifically, a centrifugal movable device D is built in the movable sheave 1B side. The centrifugal movable device $D_1$ has a structure in which the movable sheave 1B is drawn to approach the fixed sheave 1A side as the revolution speed of the input shaft 3 is increased, and the movable sheave 1B is pushed to separate from the fixed sheave 1A side as the revolution speed of the input shaft 3 is decreased.

A plurality of fins 4 are provided on a back face (a left face in FIG. 1) 1a of the fixed sheave 1A so that a centrifugal cooling fan is formed.

As shown in FIG. 1, the driven pulley 2 is provided on an output shaft 8 of the transmission so as to rotate integrally. The driven pulley 2 includes a fixed sheave 2A and a movable sheave 2B in pairs. The movable sheave 2B is formed so as to approach or separate from the fixed sheave 2A provided on an opposite side of the engine E over the output shaft 8 corresponding to operation of the drive pulley 1. More specifically, a movable device $D_2$ is built in the driven pulley 2. The movable device $D_2$ serves to cause the movable sheave 2B to separate from the fixed sheave 2A side during high speed driving and to approach the fixed sheave 2A side during low speed driving, for example, under high load conditions.

The movable devices $D_1$ and $D_2$ of the drive pulley 1 and the driven pulley 2 operate synchronously. When the movable device $D_1$ on the drive pulley 1 side causes the movable sheave 1B to operate so as to approach the fixed sheave 1A side, the movable device $D_2$ on the driven pulley 2 side causes the movable sheave 2B to operate synchronously so as to separate from the fixed sheave 2A side, and when the movable device $D_1$ on the drive pulley 1 side causes the movable sheave 1B to operate so as to separate from the fixed sheave 1A side, the movable device $D_2$ on the driven pulley 2 side causes the movable sheave 2B to operate synchronously so as to approach the fixed sheave 2A side.

The movable devices $D_1$ and $D_2$ themselves have well-known structures.

The housing H includes a wall $H_1$ of the engine E (the left side in FIG. 1) and a cover $H_2$ positioned on the outside of a transmission mechanism interposed therebetween (on the right side in FIG. 1) for covering the transmission mechanism. The cover $H_2$ has an almost elliptic shape so as to surround the drive pulley 1 and the driven pulley 2 shown in FIG. 2 as seen from a side. At least the wall surrounding the drive pulley 1 and the driven pulley 2 is substantially ellipticly shaped. As shown in FIG. 1, an intake port 5 is formed on the wall $H_1$ of the housing H on the engine side (the left side in FIG. 1) corresponding to a suction port 1a formed on the center of the fin 4 provided on a back face of the fixed sheave 1A in the housing H.

Figure 3:
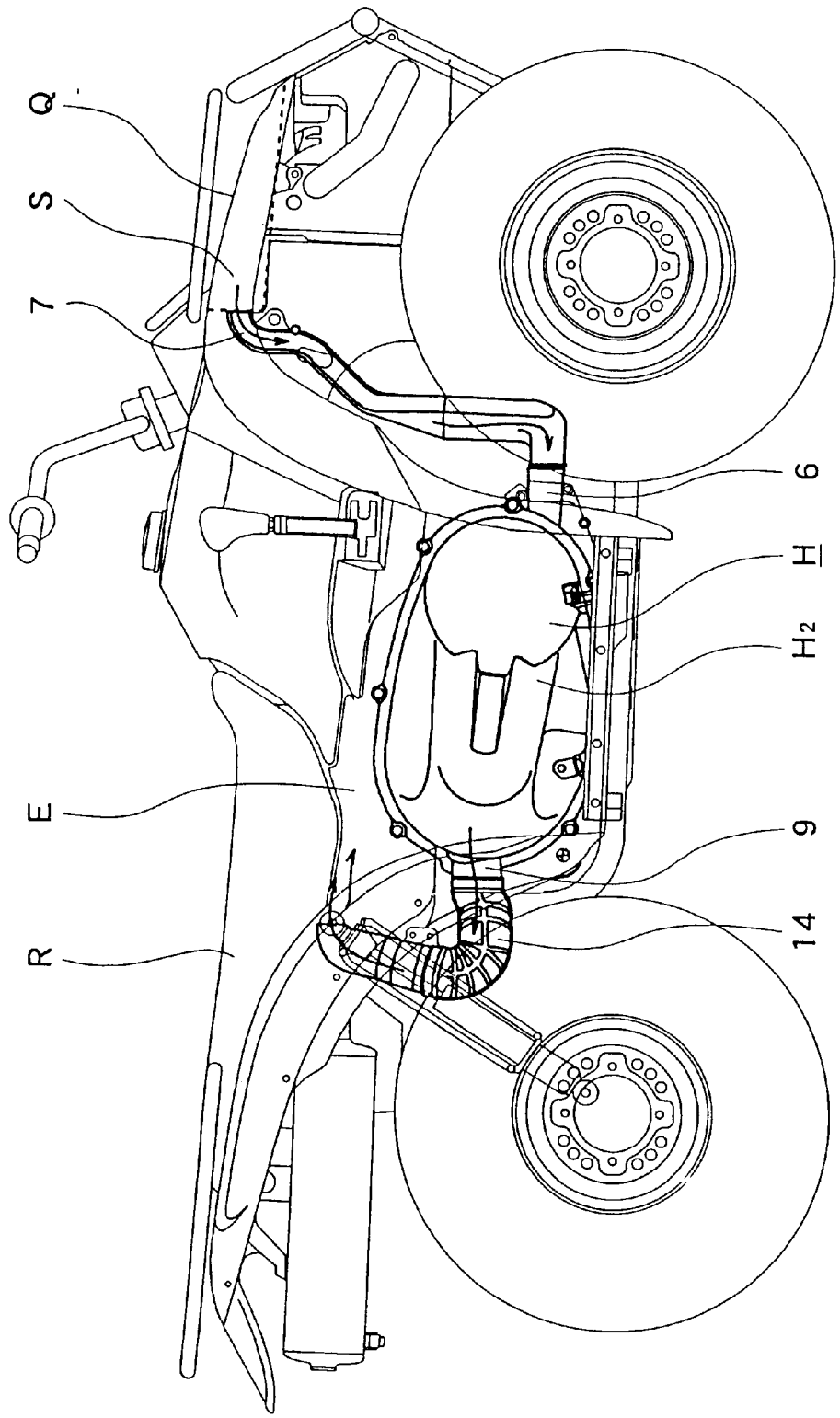
FIG. 3 is a side view of a vehicle perspectively showing arrangements of an intake duct and an exhaust duct with a belt transmission for vehicles according to the embodiment of the present invention mounted on the vehicle.
Figure 4:
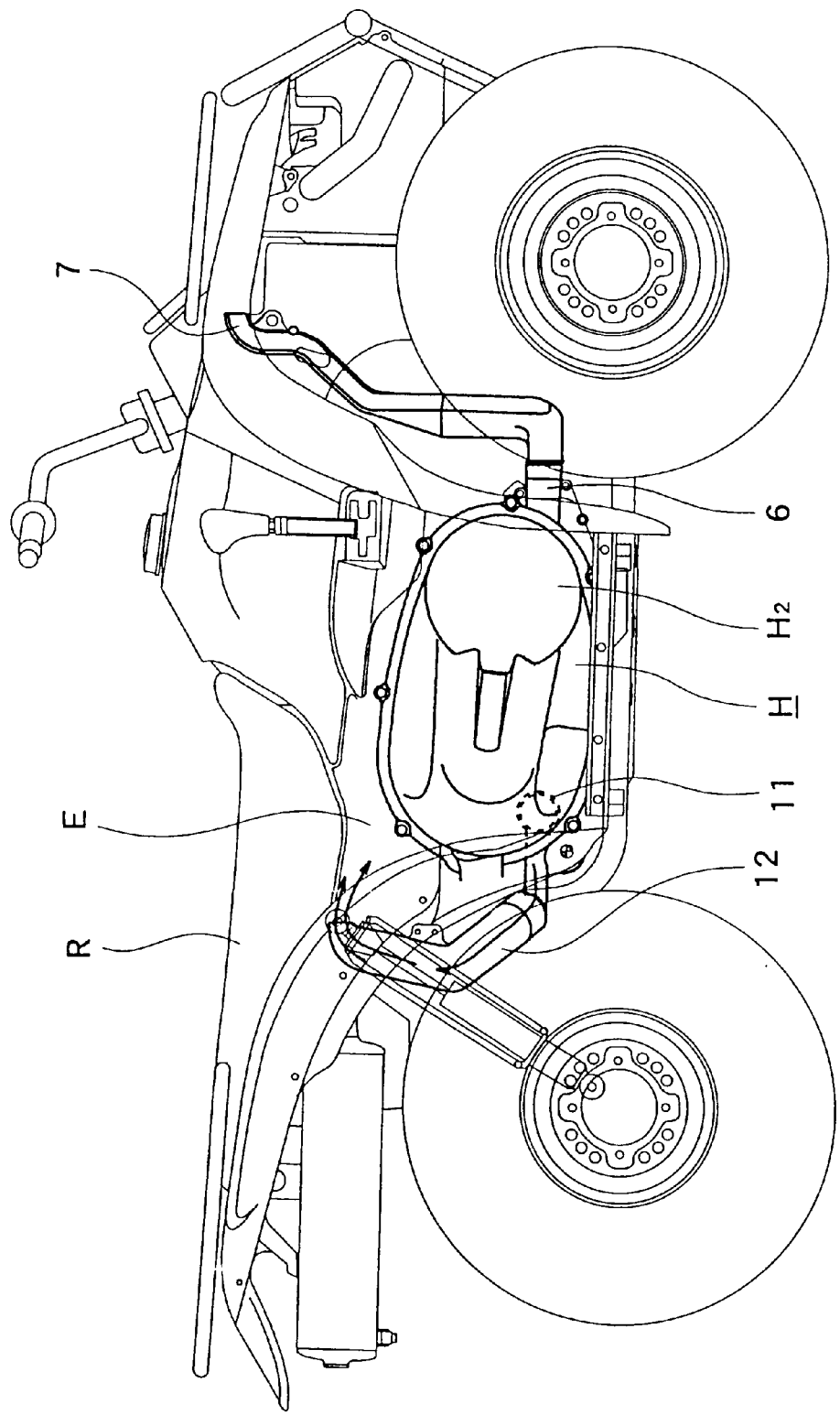
FIG. 4 is a side view of the vehicle perspectively showing arrangements of the intake duct and a second exhaust duct with the belt transmission for vehicles according to the embodiment of the present invention mounted on the vehicle.

The intake port 5 is extended up to a space S provided below a bonnet Q on a front of the vehicle through an intake path 6 and an intake duct 7 as shown in FIGS. 2, 3 and 4. The space S is opened toward a front of the vehicle. The other peripheral faces of the space are generally insulated from the outside. The intake duct 7 is connected to an opening formed on the insulated rear face.

An exhaust port 9 is formed preferably on a rear end of the housing H. In the present embodiment, as shown in FIG. 2, the exhaust port 9 is located on the housing H on a normal line extended rearward through a center $O_3$ of rotation of the driven pulley 2, and is directed roughly toward the normal line (i.e. air flow outwardly at the exhaust port 9 is roughly directed along the extended normal line). In more detail, the exhaust port 9 is located on the housing on a horizontal line extended rearward through the center $O_3$ of rotation of the driven pulley 2 and is directed approximately toward the center $O_3$ of rotation of the driven pulley 2. As shown in FIGS. 1 and 2, the housing H is formed so as to be gradually reduced toward the exhaust port 9 as seen in a plane and from a side. In other words, as shown in FIG. 1, the housing H is formed in such a manner that a side wall ha of the cover $H_2$ is gradually reduced from a central portion of the driven pulley 2 toward the exhaust port 9 as seen in a plane and a peripheral wall ha of the cover $H_2$ is gradually reduced toward the exhaust port 9 so as to surround a periphery of the driven pulley 2 from the central portion of the driven pulley 2 toward the exhaust port 9 as seen from a side. The cover $H_2$ is formed of plastic such that a light weight and a smooth surface can be obtained.

As shown in FIG. 2, a guide portion 10 is formed on a connecting portion of the exhaust port 9 of the housing H having the exhaust port 9 formed thereon such that a cooling air $W_1$ flowing along the bottom wall of the housing H is guided to the outside of the exhaust port 9. In the present embodiment, the guide portion 10 includes a weir portion 10a to change direction of the cooling air $W_1$ and conduct it to the exhaust port 9, and a guide wall portion 10b to conduct the cooling air $W_1$ to the weir portion 10a as shown in FIG. 2. In the present embodiment, the drive pulley 1 rotates clockwise in FIG. 2, and the amount of the cooling air $W_1$ flowing along the bottom wall of the housing H shown in FIG. 2 from the intake port 5 toward the exhaust port 9 is high (this flow is a mainstream). Consequently, the guide wall portion 10b is formed along an internal wall of the housing H in a direction of a tangent from a slightly low portion on a lower end 9a of an inlet end of the exhaust port 9. In addition, the weir portion 10a is formed on an upper end 9b of the inlet end of the exhaust port 9 in succession to a terminal end of the guide wall portion 10b and meet the to main stream of cooling air at an upward position of the upper part of the exhaust port 9. The weir portion 10a is constructed with a wall with an angle θ of about 90 degrees to the guide wall portion 10b. An angle α formed by the guide wall portion 10b and a center line of the exhaust port 9 has an intersection angle of about 80 degrees. The guide wall portion 10b is connected to the weir portion 10a by a smooth curve such that the cooling air $W_1$ is turned smoothly. As described above, the cooling air $W_1$ flowing along the bottom of the housing H is caused to flow along the guide wall portion 10b in the direction of the tangent from slightly below the lower end 9a of the inlet end of the exhaust port 9, and is caused to closely come in contact with the weir portion 10a and to be turned toward the inside of the exhaust port 9 and guided to the outside of the housing H.

While the angle θ formed with respect to the guide wall portion 10b is set to about 90 degrees in the present embodiment, it may be set to an optimal value in consideration of a strength of the cooling air, the intersection angle α formed by the guide wall portion and the center line of the exhaust port and the like. Furthermore, the angle α formed by the guide wall portion 10b and the center line of the exhaust port 9 is not restricted to about 80 degrees. The weir portion 10a, which is not always located at an upward position of the upper part of the exhaust port 9, may be located in line with the upper end 9c of the exhaust port 9.

In the above embodiment the guide wall portion 10b is formed in a direction of a tangent from a slightly low portion on a lower end 9a of an inlet end of the exhaust port 9. However the present invention is not limited to the above embodiment if the guide wall portion 10b may introduce a cooling air into the exhaust port in cooperation with the weir portion 10a.

As shown in FIG. 1, the exhaust port 9 is arranged such that a center line $O_2$ of the movable sheave 2B and the fixed sheave 2A of the driven pulley 2 is almost coincident with a center line $O_9$ of the exhaust port 9 when the movable sheave 2B is the closest to the fixed sheave 2A as seen in a plane.

As shown in FIG. 3, the exhaust port 9 is connected to a space formed below a seat R of the vehicle through a flexible exhaust duct 14 (which can bend freely) so as to exhaust the cooling air toward the engine E side positioned ahead thereof. During backward movement of the vehicle, mud, water, dust and the like can be prevented from getting into the exhaust port 9 from the back.

A second exhaust port 11 is provided on the wall $H_1$ of the housing H on the engine E side of the movable sheave 2B of the driven pulley 2 in parallel with the output shaft 8, that is, in parallel with a direction of movement of the movable sheave 2B. The second exhaust port 11 is positioned near a bottom portion of the housing H and near a peripheral portion of the movable sheave 2B as seen from a side shown in FIG. 2. And as seen in a plane shown in FIG. 1, the second exhaust port 11 is provided on the wall $H_1$ on the engine E side faced to the backside of the movable sheave 2B. Accordingly, when the movable sheave 2B is the closest to the fixed sheave 2A, the movable sheave 2B separates from the inlet end of the second exhaust port 11 so that a large space is formed.

Figure 5:
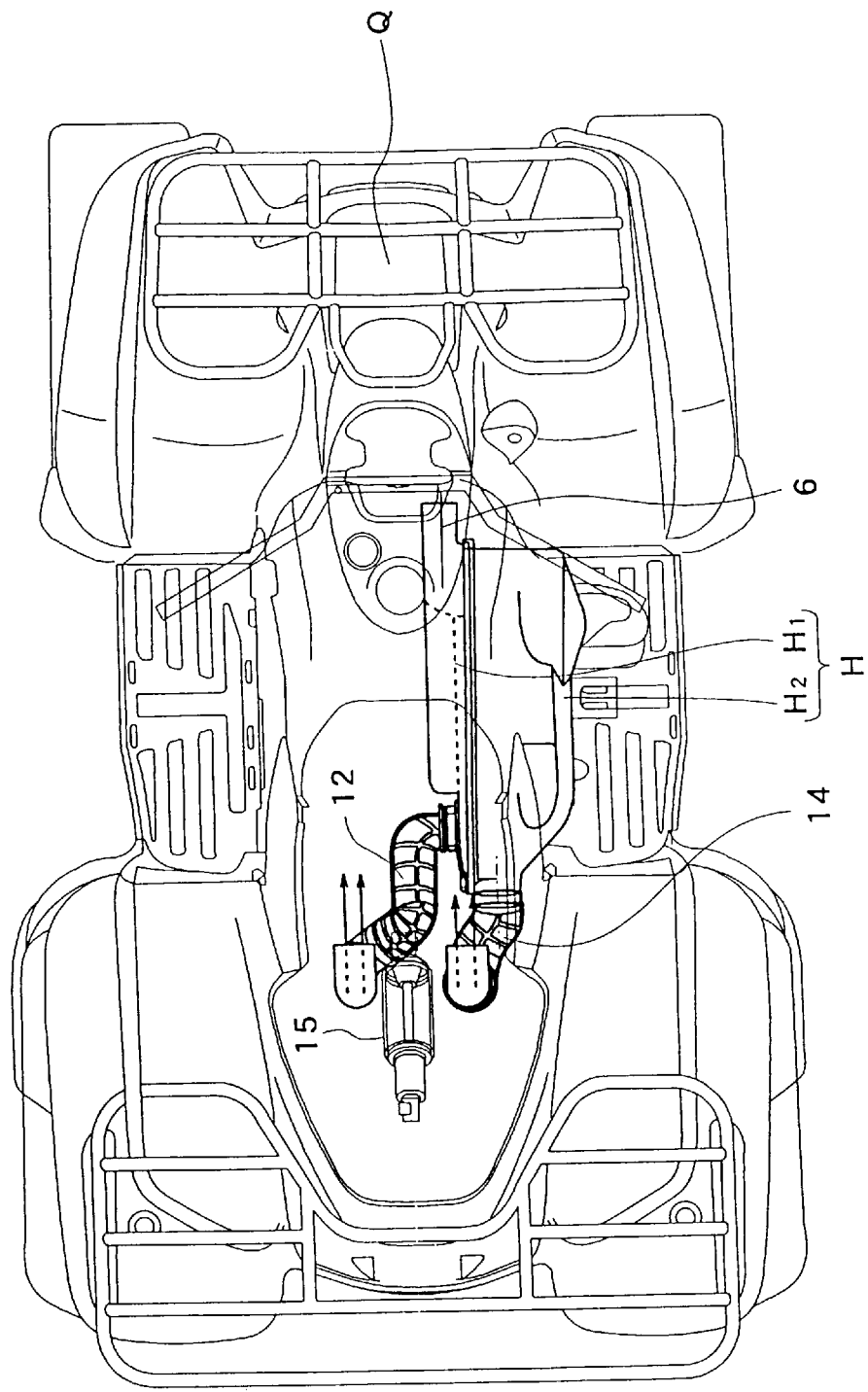
FIG. 5 is a plan view of the vehicle perspectively showing each arrangement state of the exhaust duct and the second exhaust duct with the belt transmission for vehicles according to the embodiment of the present invention mounted on the vehicle.

In the state in which the belt transmission for vehicle is mounted on the vehicle, the side wall ha of the housing H opposite to the wall $H_1$ is positioned on the outside of the vehicle as shown in FIG. 1 (see FIG. 5). The second exhaust port 11 is provided on the wall $H_1$ of the housing H on the engine E side. Accordingly, the exhaust duct 12 originating and extending from the second exhaust port 11 does not protrude onto the outside of the vehicle.

Figure 6:
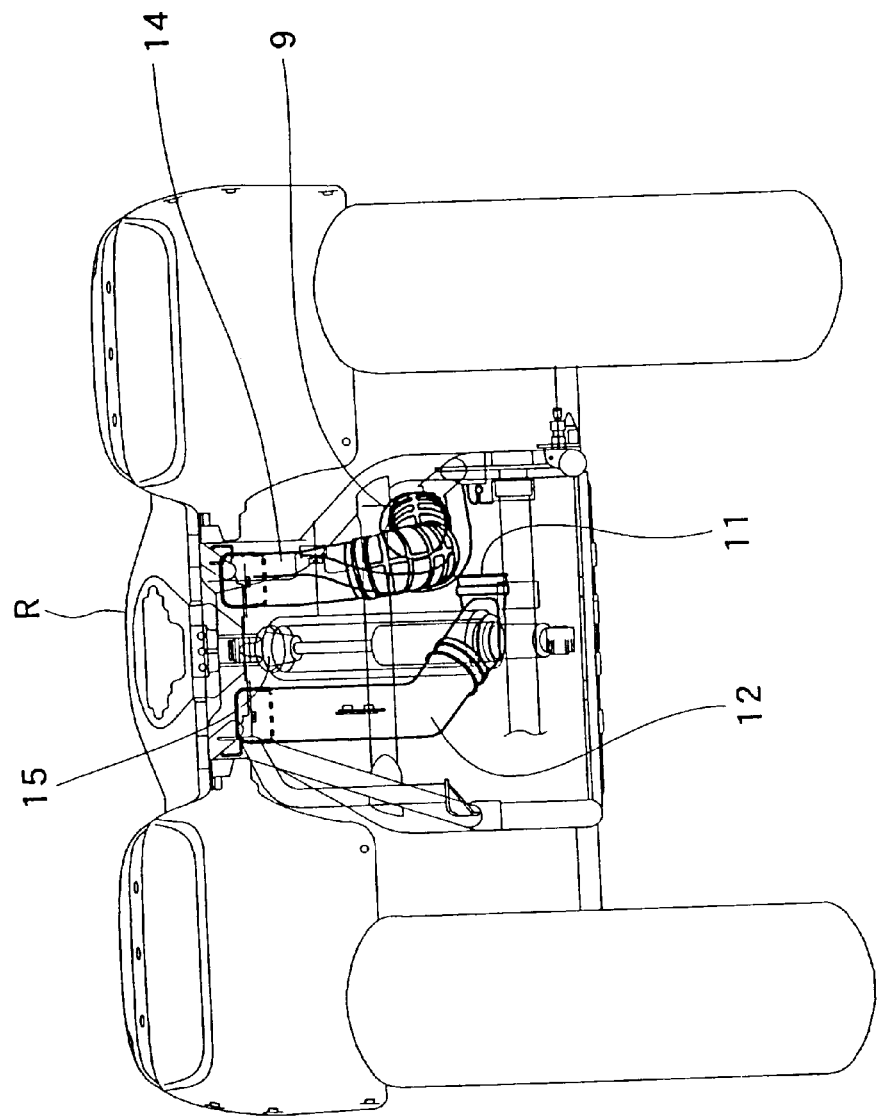
FIG. 6 is a rear view of the vehicle perspectively showing each arrangement state of the exhaust duct and the second exhaust duct with the belt transmission for vehicles according to the embodiment of the present invention mounted on the vehicle.

The second exhaust port 11 is connected to a space below the seat R, communicating with the outside through the exhaust duct 12 as shown in FIGS. 4 to 6. The exhaust duct 12 is provided so as not to interfere with the exhaust duct 14 and a suspension 15 of a rear wheel of the vehicle.

The exhaust duct 12 and the exhaust duct 14 are provided on both sides with the suspension 15 interposed therebetween in such a manner that the exhaust duct 12 and the exhaust duct 14 do not interfere with each other as seen in a plane shown in FIG. 5 and as seen from the rear shown in FIG. 6.

In the present embodiment, the wall $H_1$ of the housing H on the engine side is an outer wall of a crankcase of the engine E such that a dimension of the transmission in a direction of a width is reduced as much as possible. In other words, an outer wall of an aluminum die casting crankcase of the engine E is used as the wall $H_1$ of the housing H on the engine side.

The belt transmission for vehicles having the above-mentioned structure has the following functions for cooling the inside of the housing thereof as well as usual speed changing functions.

When the vehicle runs at a high speed, the input shaft 3 rotates at a high speed so that a large amount of cooling air is forcedly sucked from the intake port 5 into the housing H by the fin 4 provided on the fixed sheave 1A of the drive pulley 1.

In this case, the driven pulley 2 is brought into the state in which the movable sheave 2B separates from the fixed sheave 2A most greatly and the drive belt B is moved nearest to the center of the pulley. Consequently, a large path (space) for the cooling air is formed between the fixed sheave 2A and the movable sheave 2B as seen in a plane shown by a two-dotted line in FIG. 1, and a large amount of air passes through the path and is exhausted from the exhaust port 9 to the outside through the exhaust duct 14. In this case, as the large path is formed as described above, a pressure loss is reduced as much as possible. Accordingly, a large amount of air sucked from the intake port 5 can pass through the housing H, can absorb heat in the housing H and can effectively be exhausted to the outside. The drive pulley 1 rotates clockwise as seen from a side shown in FIG. 2. For this reason, the air sucked into the housing H generates a flow of a large amount of cooling air (mainstream) in a direction shown by an arrow $W_1$. The cooling air $W_1$ flows toward the exhaust port 9 along the bottom portion of the housing H. Since the housing H (the cover $H_2$ of the housing H) is formed so as to be gradually reduced toward the exhaust port 9 and the guide portion 10 is formed on the exhaust port 9, the cooling air $W_1$ is effectively gathered in the exhaust port 9 and is exhausted to the outside. In this case, furthermore, a cooling air $W_2$ is also generated. The cooling air $W_2$ helps the cooling air $W_1$ being turned in the weir portion 10a.

As a matter of course, also in this case the air cooling the back face (the left face in FIG. 1) of the movable sheave 2B of the driven pulley 2 and the like is also exhausted from the second exhaust port 11.

As stated above, when the vehicle runs at a high speed, a large amount of air is sucked by high speed rotation of the drive pulley 1 and is exhausted from the exhaust port 9 with a very small pressure loss, that is, due to a large space formed between sheaves of the driven pulley 2, and the air cooling the back face of the movable sheave 2B is also exhausted from the second exhaust port 11. As a result, the inside of the housing H can be cooled effectively.

When the vehicle runs under low speed/high load conditions, the driven pulley 2 is kept in a state in which the movable sheave 2B is close to the fixed sheave 2A as shown by a solid line in FIG. 1. For this reason, a space (path) which is formed ahead of the exhaust port 9 is not larger than a space formed during high speed running. However, the housing H is formed so as to be gradually reduced toward the exhaust port 9, and the guide portion 10 is formed on the exhaust port 9. Consequently, the air flowing in the housing H is effectively exhausted from the exhaust port 9. In addition, since the movable sheave 2B is moved to the fixed sheave 2A side (see the flexible sheave 2B shown by a solid line in FIG. 1), there is no obstacle ahead of the second exhaust port 11. Consequently, the air sucked from the intake port 5 is effectively exhausted from the second exhaust port 11 as well as the exhaust port 9. Accordingly, the inside of the housing H is effectively cooled under the low speed/high load conditions of the vehicle.

In the belt transmission for vehicles, an exhaust fin is not provided on the driven pulley 2. For this reason, the power of an engine is not consumed unnecessarily so that high runability performance can be obtained.

As described above, the second exhaust port 11 and the exhaust duct 12 are formed on the engine side of the housing H and do not protrude onto the outside of the vehicle (see FIG. 5). In addition, because the outer wall of the engine is the wall $H_1$ of the housing H on the engine side, the dimensions of the engine and the transmission in the direction of the width can be reduced as much as possible. As a result, a driver who rides on the vehicle can get a good driving position.

In the present embodiment, the exhaust port 9 is provided in a position of the housing H on the extended line in the direction of the normal through the center $O_2$ of rotation of the driven pulley 2 backward as shown in FIG. 2. If some reduction in a smooth cooling air flow is permitted, the exhaust port may be turned obliquely upward or downward from the same arrangement, that is, it may be provided in the position of the housing on the extended line in the direction of the normal of the driven pulley at the back of the center of rotation of the driven pulley as seen from a side.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A cooling structure of a belt transmission for vehicles comprising:

a transmission mechanism including a drive pulley which is driven by a drive shaft of an engine and has a variable pitch diameter, and a driven pulley which is driven by the drive pulley through a drive belt and has a variable pitch diameter;

a substantially elliptic housing accommodating the belt transmission mechanism and having round walls on its opposite ends to surround the drive pulley and the driven pulley;

a cooling fan formed on the drive pulley;

an intake port formed in the vicinity of a suction part of the cooling fan of the housing for forcedly introducing air from an outside into the housing;

an exhaust port formed in the vicinity of the driven pulley of the housing for exhausting the air cooling an inside of the housing to the outside, wherein the exhaust port is provided on the housing in a direction normal to a longitudinal axis of the driven pulley at the rearward of a center of rotation of the driven pulley as seen from a side; and a guide portion having a guide wall portion and a weir portion is formed on a connecting portion of the exhaust port to the housing so that it may introduce a mainstream of cooling air, which is forcedly supplied into the housing by the cooling fan, into the exhaust port and;

the guide wall portion originating in a lower end of an inlet end of the exhaust port extends toward the outlet of the exhaust port in a direction tangent to an internal wall of the housing, the weir portion is formed in succession to a terminal end of the guide wall portion and extends in a direction normal to the guide wall portion to come into the internal wall of the housing.

2. The cooling structure of a belt transmission for vehicles as defined in claim 1, wherein the driven pulley includes a V-tapered trench and the driven pulley is provided in such a manner that the exhaust port fronts the V-tapered trench of the driven pulley.

3. The cooling structure of a belt transmission for vehicles as defined in claim 1, wherein the exhaust port is directed to substantially rearward.

4. The cooling structure of a belt transmission for vehicles as defined in claim 1, wherein a rear portion of the housing is formed so as to be gradually reduced toward the exhaust port.

5. The cooling structure of a belt transmission for vehicles as defined in claim 1, wherein the weir portion extends at an angle of about 90 degrees to the guide wall portion.

6. A cooling structure of a belt transmission for vehicles comprising;

a belt transmission mechanism including a drive pulley which is driven by a drive shaft of an engine and has a variable pitch diameter, and a driven pulley which is driven by the drive pulley through a drive belt and has a variable pitch diameter;

a substantially elliptic housing accommodating the belt transmission mechanism and having round walls on its opposite ends to surround the drive pulley and the driven pulley;

a cooling fan formed on a side of the drive pulley;

an intake port formed in the vicinity of a suction part of the cooling fan of the housing for forcedly introducing air from an outside into the housing;

a first exhaust port formed in the vicinity of the driven pulley of the housing for exhausting the air cooling an inside of the housing to the outside and provided on the housing in a direction normal to a longitudinal axis of the driven pulley at the rearward of a center of rotation of the driven pulley as seen from a side; and a second exhaust port provided at a side wall of the housing facing to the backside of the movable sheave of the driven pulley.

7. The cooling structure of a belt transmission for vehicles as defined in claim 6, wherein a movable sheave of the driven pulley is positioned in an inner part of the housing with respect to a fixed sheave.

8. The cooling structure of a belt transmission for vehicles as defined in claim 7, wherein the second exhaust port is positioned facing to the backside of the movable sheave of the driven pulley.

9. The cooling structure of a belt transmission for vehicles as defined in claim 6, wherein the driven pulley includes a V-tapered trench and the driven pulley is provided in such a manner that the exhaust port fronts the V-tapered trench of the driven pulley.

* * * * *